No. 862,395.
PATENTED AUG. 6, 1907.
A. HECTOR.
CAR SWITCHING MECHANISM.
APPLICATION FILED JAN. 24, 1907.
2 SHEETS—SHEET 1.
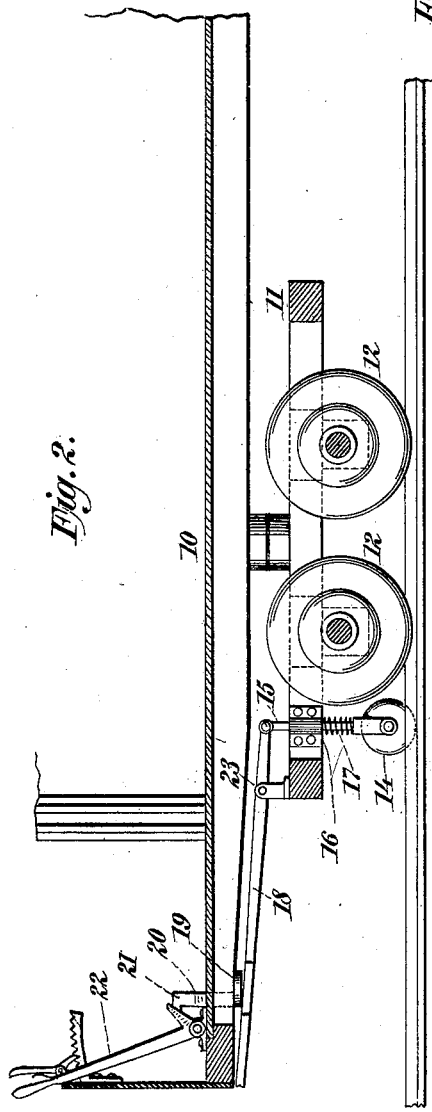
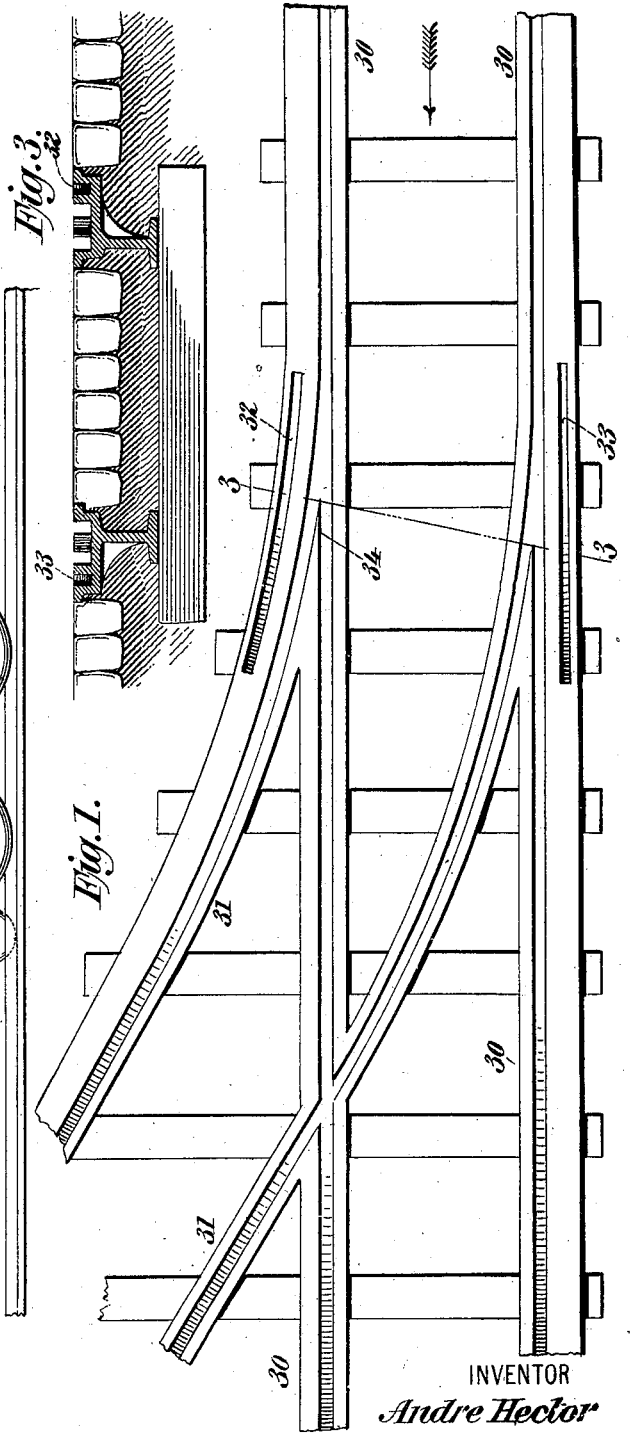
WITNESSES:
INVENTOR
Andre Hector
BY
ATTORNEY

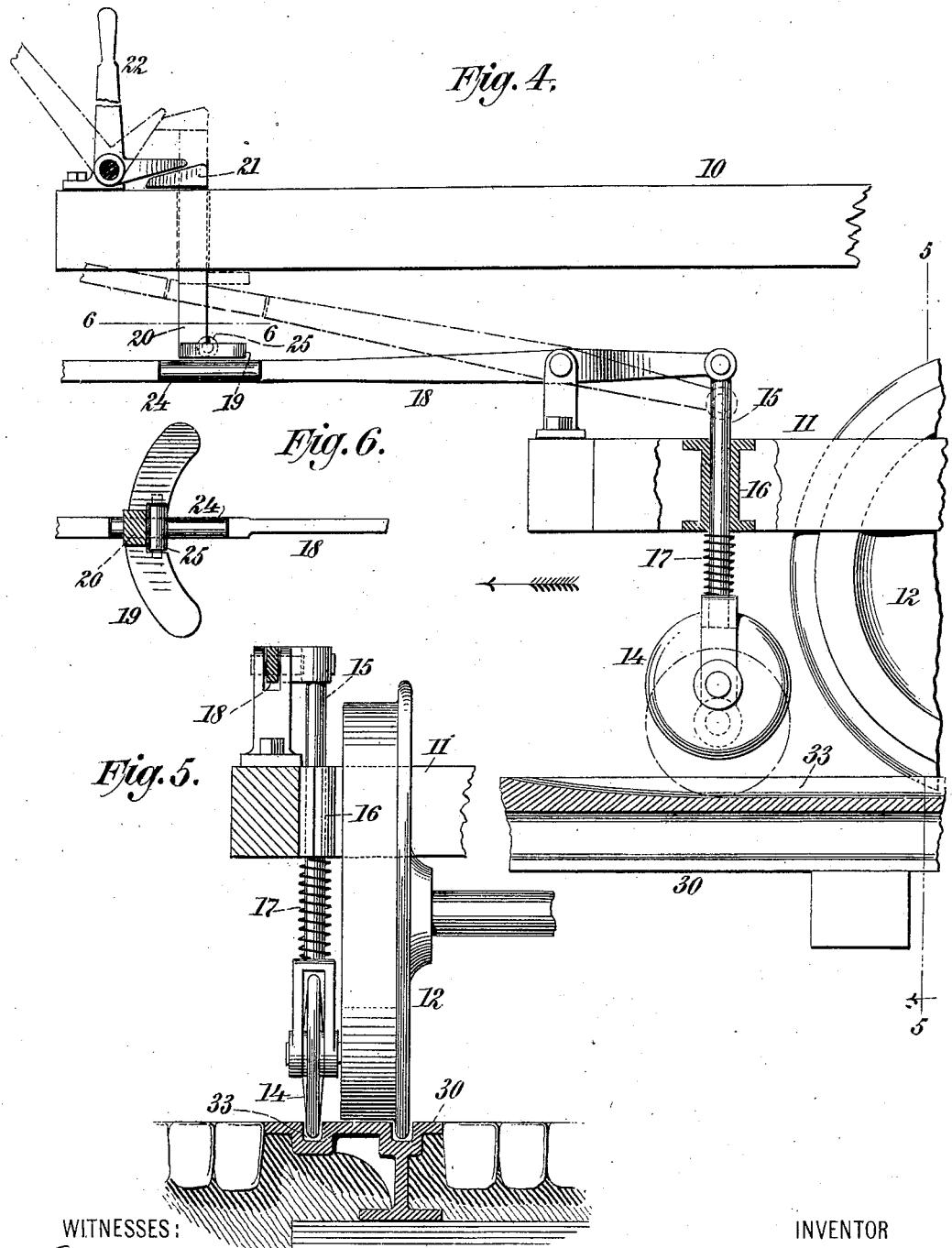

UNITED STATES PATENT OFFICE.

ANDRE HECTOR, OF EAST NEWARK, NEW JERSEY, ASSIGNOR OF ONE-THIRD TO JOHN WILLIAM REID AND ONE-THIRD TO WILLIAM BARDSLEY, BOTH OF KEARNY, NEW JERSEY.

CAR-SWITCHING MECHANISM.

No. 862,395.  Specification of Letters Patent.  Patented Aug. 6, 1907.

Application filed January 24, 1907. Serial No. 353,763.

*To all whom it may concern:*

Be it known that I, ANDRE HECTOR, a citizen of Great Britain, and a resident of East Newark, in the county of Hudson and State of New Jersey, have invented certain new and useful Improvements in Car-Switching Mechanism, of which the following is a specification.

The invention relates to improvements in car-switching mechanism, and consists in the novel features and combinations of parts hereinafter described, and particularly pointed out in the claims.

The object of the invention is, more particularly, to produce a simple and efficient means for directing cars and the like from one to another pair of connecting rails at a switching point without the use of movable switches or parts on the road-bed.

In the accompanying drawings I illustrate my invention in connection with a main and branch line for trolley car service, and in carrying out my invention I provide the truck with a vertically movable pilot, preferably in the form of a wheel, and the track rail at a curve or branch with a groove into which said wheel, traveling in advance of the truck wheels, may pass and by its engagement with the edges thereof compel the truck to swivel in the proper direction to insure the passage of the truck and consequently of the car around said curve. The pilot wheel is adapted to travel upon the track rail and automatically enter the groove or elongated recess therein whose walls cooperate with said wheel in turning the truck in the proper direction. Preferably the pilot wheel will be equipped with a spring normally acting to drive the pilot wheel downwardly against and compel it to follow the track rail, and upon the car body will be applied any suitable mechanism for maintaining the pilot wheel in an elevated position clear of the track rail except at such time as the car may be approaching a switch, when the pilot controlling mechanism will be released and the spring allowed to depress the pilot wheel upon the track rail preparatory to the same entering the groove therein for effecting the proper swiveling action of the truck.

The invention will be fully understood from the detailed description hereinafter presented, reference being had to the accompanying drawings, in which:

Figure 1 is a top view of a portion of a road-bed having a main and a branch line and embodying a portion of my invention; Fig. 2 is a central vertical longitudinal section through a portion of a car and one of its trucks, the latter being equipped with the pilot mechanism of my invention to coöperate with the track system shown in Fig. 1 and particularly for directing the car from the main line rails onto the branch rails at the switching point; Fig. 3 is a transverse section of the road bed on the dotted line 3—3 of Fig. 1; Fig. 4 is a side elevation, partly in section, of a portion of a car equipped with a pilot wheel and its mechanism embodying my invention, the pilot wheel being shown in its upper inoperative relation by solid lines and in its lower operative position by dotted lines, the sectional portion of the track rail of Fig. 4 being centrally through the lower straight rail shown in Fig. 1, and the pilot of Fig. 4 being intended to keep the car directly on the straight line rails when crossing the switching point; Fig. 5 is a vertical transverse section through a portion of the same on the dotted line 5—5 of Fig. 4; and Fig. 6 is a detached horizontal section on the dotted line 6—6 of Fig. 4 of a portion of the mechanism for operating the pilot wheel.

In the drawings, 10 designates a portion of a car of any suitable construction, 11 one of the swiveling trucks thereof provided with the usual wheels 12, and 14 a pilot-wheel carried by the lower end of a vertical rod 15 mounted within a bearing 16 at a corner of the truck in advance of the wheel 12. The lower end of the rod 15 is bifurcated to receive the wheel 14 and between the bearing 16 and the shoulder formed by its bifurcated portion, said rod has mounted upon it a coiled spring 17 normally acting to press the wheel 14 downwardly upon the track rail. The pilot wheel 14 will, except when it is to be put into use, be held clear of the track rail by any suitable means provided on the car for that purpose, and in the present instance I secure to the upper end of the rod 15 a pivoted lever arm 18 extending forwardly below a segmental plate 19 carried upon the lower end of a vertically movable rod 20 which extends upwardly through the car flooring and is formed with a toe 21 adapted to be engaged by a short arm formed at the lower end of a hand lever 22. The tension of the spring 17 maintains the lever arm 18 against the segmental plate 19, as shown in Fig. 2, and when it is desired to elevate the pilot wheel 14 from the track rail, the lever 22 is pulled to depress the rod 20 and plate 19 and thereby through said plate effect the depression of the front end of the lever 18, which turning on its pivot 23 will move the rod 15 and wheel 14 upwardly to the position shown by full lines in Fig. 4. The segmental plate 19 is shown in top elevation in Fig. 6 and it is of sufficient length to enable the lever arm 18 to remain in contact with some portion of it at all times, whether the car-truck carrying said lever arm is in line with the body of the car or has swiveled at an angle thereto. In order to avoid undue friction between the lever 18 and plate 19 I form said lever with the roller 24 to contact with the lower surface of the plate 19, and I also provide the plate 19 with a roller 25 against which the roller 24 may bear during the usual straight travel of the car and truck. The plate 19 and the means for depressing it to elevate the pilot 14 are not essential features of my invention and they may be modified or varied at will, since my invention pertains to the vertically movable pilot carried by the car, in connection with the track system hereinafter described regardless of the means for moving said pilot.

With reference to the track system, 30 designates the main line rails, and 31 the branch line rails leading therefrom at a switching point, and the novel portion of this part of my invention resides in the fact that I dispense entirely with movable switches and the like and all of their accessories and simply provide the track rails with elongated recesses 32, 33 for coöperation with the pilot or pilots carried by the car-trucks or the car. The recess 32 is utilized in connection with the pilot wheel 14 for directing a car from the main line rails 30 onto and along the curved rails 31, and said recess 32 is so disposed with relation to the point of the frog 34 that it will receive the pilot wheel 14 before the front wheel 12 of the truck can reach the point of said frog, whereby the truck will become swiveled to follow the curve and the wheels thereof will be kept properly upon the tread of the rails and any danger of the wheels striking the frogs obviated.

When a car intended to take the branch-line rails and carrying the pilot wheel 14 is approaching a switching point the motorman or other attendant on the car will release the operating lever 22 and permit the spring 17 to depress said pilot wheel upon the track rail, in this instance upon the rail 30 represented at the upper right hand side of Fig. 1, and the car continuing in motion the said pilot wheel will enter the elongated recess 32, whose edges, due to the curvature of said recess and their engagement with said pilot wheel, will force the car truck to swivel and the truck wheels to take the branch rails 31, thereby directing the car from the main rails 30 upon the said branch rails. After the car has passed beyond the switching point the attendant on the car will, with the use of the lever 22, depress the rod 20 against the lever 18 and cause the latter to elevate the pilot wheel 14 clear of the track-rail, said wheel remaining in its elevated position until the car shall reach another switching point and the use of said wheel again become necessary. I illustrate only a portion of the car body and only one car truck, but usually two car trucks are placed below a car and in all such instances each truck will be provided on a forward corner with a pilot wheel to take the elongated recess 32, so that both car trucks may be properly swiveled by said recess acting upon and with the pilot wheels.

The recess 33 in the main track-rail 30 will be utilized in connection with a pilot wheel 14 applied at the front right hand corner of the car-truck or trucks (Fig. 4) for assuredly keeping the truck-wheels upon the main tracks 30 and preventing under any circumstances the said wheels from striking the points of the frogs, and said pilot wheel will be a duplicate of the pilot wheel 14 shown in Fig. 2 and have a corresponding operation, with the exception that the elongated recess 33 being straight the purpose of said recess and its co-operating pilot wheel will be to keep the car-truck straight and assure its correct travel on the main track rails 30.

The more essential feature of my invention is the provision of a pilot on the car and a curved elongated recess in the track rail at a switching point, so as to effectually direct a moving car from the main line onto the branch line without the employment of movable switches and their accessories at said point. The pilot wheel may be duplicated at the four corners of the truck or at the four corners of the car in accordance with the conditions that may be met, and I have illustrated the pilot wheel at the forward left hand corner of the truck shown in Fig. 2 as an illustration of the invention and for the purpose of explaining the manner in which said one pilot wheel may direct the car from the main rails 30 onto the branch rails without the use of movable switch members on the road bed. It is very desirable however that the car-truck be provided at its forward end with a pilot wheel 14 for coöperation with the straight recess 33 so that the car-truck may be kept straight upon the rails 30 and all tendency to strike the points of the frogs, at the switching point, be avoided, and therefore I have illustrated in Figs. 4 and 5 the pilot wheel as being on the forward left hand corner of the car truck of a car intended to remain on the main line rails 30.

As hereinbefore indicated I do not limit the invention to any special lever mechanism for operating the pilot wheel 14. The handle 22 will be thrown in one direction by the action of the spring 17 and will become arrested before the tension of the spring 17 becomes entirely relieved, so that the wheel 14 may roll on the track-rail with some firmness and under a yielding pressure. The attendant on the car will pull the handle 22 toward himself, when it is desired to depress the forward end of the lever 18, and elevate the pilot wheel 14, and the handle 22 when thus pulled by the attendant on the car will be maintained in the position given to it by any suitable means that may be provided for the purpose, the only object being to lock the handle 22 so that when it is released by the attendant, the spring 17 may not immediately return it to the position shown in Fig. 2.

What I claim as my invention and desire to secure by Letters Patent, is:—

1. In car directing mechanism, a rail having at a switching point in the track system, an elongated recess, combined with a pilot carried by the car in advance of the wheels thereof, and means for elevating and depressing said pilot toward and from said rail, said pilot being disposed on the vertical plane of said rail and adapted when depressed to ride on the same and into said recess and by its engagement with the walls thereof cause the car wheels to follow the direction defined by said recess; substantially as set forth.

2. In car directing mechanism, a rail having at a switching point in the track system an elongated recess, combined with a pilot carried by the car in advance of the wheels thereof, a spring for depressing said pilot upon said rail, and means for elevating the same therefrom, said pilot being disposed on the vertical plane of said rail and adapted when depressed to ride on the same and into said recess and by its engagement with the walls thereof cause the car wheels to follow the direction defined by said recess; substantially as set forth.

3. In car directing mechanism, a rail having at a switching point in the track system an elongated recess, a car having a swiveling truck, a pilot carried by said truck in advance of the wheels thereof, and means for elevating and depressing said pilot toward and from said rail, said pilot being disposed on the vertical plane of said rail and adapted when depressed to ride on the same and into said recess and by its engagement with the walls thereof cause the car wheels to follow the direction defined by said recess; substantially as set forth.

4. In car directing mechanism, a rail having at a switching point in the track system an elongated recess, a car having a swiveling truck, a pilot carried by said truck in advance of the wheels thereof, a spring for depressing said pilot upon said rail, and means for elevating the same therefrom, said pilot being disposed on the vertical plane of said rail and adapted when depressed to ride on the same and into said recess and by its engagement with the walls thereof cause the car wheels to follow the direction defined by said recess; substantially as set forth.

5. In car directing mechanism, a rail having at a switching point in the track system an elongated recess, combined with a pilot carried by the car in advance of the car wheels and in the form of a vertically movable rod having on its lower end a wheel, and means for elevating and depressing said pilot toward and from said rail, said pilot being disposed on the vertical plane of said rail and adapted when depressed to ride on the same and into said recess and by its engagement with the walls thereof cause the car wheels to follow the direction defined by said recess; substantially as set forth.

6. In car directing mechanism, a rail having at a switching point in the track system an elongated recess, combined with a pilot carried by the car in advance of the car wheels and in the form of a vertically movable rod having on its lower end a wheel, a spring for depressing said pilot upon said rail, and means on the car for elevating the same therefrom, said pilot being disposed on the vertical plane of said rail and adapted when depressed to ride on the same and into said recess and by its engagement with the walls thereof cause the car wheels to follow the direction defined by said recess; substantially as set forth.

7. In car directing mechanism, a track system comprising a main line and a curved line branching therefrom and one of the curved rails of the branch line having an elongated curved recess at the switching point, a car having a swiveling truck, a pilot mounted on said truck in advance of the wheels thereof, and means for elevating and depressing said pilot toward and from said curved recessed rail and comprising a spring for holding said pilot with a yielding pressure against said rail, said pilot being disposed on the vertical plane of said rail and adapted when depressed to ride on the same and into said recess and by its engagement with the walls thereof cause the car wheels to follow the direction defined by said recess; substantially as set forth.

Signed at New York city, in the county of New York and State of New York, this 23rd day of January A. D. 1907.

ANDRE HECTOR.

Witnesses:
 CHAS. C. GILL,
 ANNA V. BRODERICK.